United States Patent
Froech et al.

(10) Patent No.: US 9,923,644 B2
(45) Date of Patent: Mar. 20, 2018

(54) METHOD FOR GENERATING A MEDICAL NETWORK

(71) Applicant: Roche Diagnostics Operations, Inc., Indianapolis, IN (US)

(72) Inventors: Sybille Froech, Mannheim (DE); Bernd Roesicke, Worms (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 826 days.

(21) Appl. No.: 13/658,310

(22) Filed: Oct. 23, 2012

(65) Prior Publication Data
US 2013/0059536 A1    Mar. 7, 2013

Related U.S. Application Data

(63) Continuation of application No. PCT/EP2011/056336, filed on Apr. 20, 2011.

(30) Foreign Application Priority Data

Apr. 23, 2010    (EP) .................................... 10160904

(51) Int. Cl.
*H04W 84/18* (2009.01)
*H04B 13/00* (2006.01)

(52) U.S. Cl.
CPC .......... *H04B 13/005* (2013.01); *H04W 84/18* (2013.01)

(58) Field of Classification Search
CPC ............................. H04B 13/005; H04W 84/18
See application file for complete search history.

(56) References Cited

U.S. PATENT DOCUMENTS

| | | |
|---|---|---|
| 6,315,719 B1 | 11/2001 | Rode et al. |
| 6,542,717 B1 | 4/2003 | Zimmerman et al. |
| 7,161,484 B2 | 1/2007 | Tsoukalis |
| 7,163,511 B2 | 1/2007 | Conn et al. |

(Continued)

FOREIGN PATENT DOCUMENTS

| | | | | |
|---|---|---|---|---|
| EP | 1382363 | * | 1/2004 | .......... A61M 5/1723 |
| EP | 1676525 B1 | | 4/2009 | |

(Continued)

OTHER PUBLICATIONS

K. Küpfmüller et al.: Theoretische Elektrotechnik: Eine Einführung, 10. Auflage, Springer Verlag, Berlin, S. 333. English translation is also attached.

(Continued)

*Primary Examiner* — Hashim Bhatti
(74) *Attorney, Agent, or Firm* — Roche Diabetes Care, Inc.

(57) ABSTRACT

A method for setting up a medical network for carrying out at least one medical function is disclosed. The medical network comprises network nodes and the network nodes are set up for communicating with one another by an initialization step, wherein the network nodes exchange initialization information that includes information characterizing the network nodes and a self-organization step where the network nodes define their role distribution. A work step where the network carries out the medical function and the two network nodes interact in the role of distribution defined in the self-organization step.

12 Claims, 3 Drawing Sheets

(56) References Cited

U.S. PATENT DOCUMENTS

| | | | |
|---|---|---|---|
| 8,395,510 B1* | 3/2013 | Kirk | G08B 25/08 340/539.12 |
| 2002/0055978 A1* | 5/2002 | Joon-Bo | H04W 84/20 709/209 |
| 2006/0277363 A1* | 12/2006 | Qiu | G06F 11/1076 711/114 |
| 2007/0027367 A1* | 2/2007 | Oliver | A61B 5/0002 600/300 |
| 2007/0067518 A1* | 3/2007 | Nichols | H04J 3/0641 710/100 |
| 2007/0238934 A1 | 10/2007 | Viswanathan | |
| 2008/0268855 A1* | 10/2008 | Hanuni | H04W 72/0406 455/445 |
| 2009/0023391 A1* | 1/2009 | Falck | A61B 5/0024 455/41.2 |
| 2009/0131759 A1 | 5/2009 | Sims et al. | |
| 2009/0240781 A1* | 9/2009 | Otsuka | H04W 84/20 709/208 |

FOREIGN PATENT DOCUMENTS

| | | |
|---|---|---|
| WO | 2004/039256 A2 | 5/2004 |
| WO | 2007/096810 A1 | 8/2007 |
| WO | 2008/015627 A1 | 2/2008 |

OTHER PUBLICATIONS

M. S. Wegmüller: "Intra-Body Communication for Biomedical Sensor Networks", Dissertation, ETH Zürich, 2007.

T. G. Zimmerman: "Personal Area Networks (PAN): Near-Field Intra-Body Communication", master's thesis at the Massachusetts Institute of Technology, Sep. 1995.

\* cited by examiner

METHOD FOR GENERATING A MEDICAL NETWORK

REFERENCE

This application is a continuation of PCT/EP2011/056336 filed 20 Apr. 2011 which is based on and claims priority to European Patent Application No. EP 10160904.8 filed 23 Apr. 2010, which are hereby incorporated by reference.

FIELD

The invention relates to a method for setting up a medical network for carrying out at least one medical function. Medical networks of this type may be used in the context of self-organizing near-body communication systems.

By way of example, networks of this type can be used to care for patients having chronic illnesses and/or high-risk patients, a plurality of whose body functions have to be monitored and/or influenced simultaneously. However, other fields of use are also conceivable.

BACKGROUND

Both in the clinical sector and in private health care, there is a need for systems and networks which are able to monitor the complex interplay of individual body functions of a patient and, if appropriate, to influence body functions in a targeted manner. By way of example, this can involve care of chronically ill patients, such as diabetes patients, for example. High-risk patients can also be cared for in this way, for example high-risk patients who are known to be at increased risk of infarct. Generally, it should be pointed out that the term "patient" used in the context of the present invention does not necessarily restrict the target group circle to ill human or animal patients, however, rather that, in principle, healthy target groups can also be cared for by means of the devices proposed below. Generally, therefore, the term "patient" can be at least substantially equated with the term "user".

In many cases, the communication between the individual components of the system presents a challenge in complex medical systems. Medical communication systems are known from various prior art documents. By way of example U.S. Pat. No. 7,161,484 B2 describes a system for monitoring medical parameters of a patient comprising at least one sensor for detecting at least one predetermined medical parameter. Furthermore, a transmission means for transmitting the medical parameters detected by the sensor is provided, wherein the transmission is sent to a remotely arranged server. U.S. Pat. No. 7,163,511 B1 describes a device and a method for frequently measuring the concentration of an analyte in a biological system. In this case, use is made of a monitoring system comprising at least two components in order to facilitate the data collection and the displaying of the data. In US 2007/0027367 A1, a personal area network for receiving, storing, processing, displaying and communicating physiological data is disclosed, which uses an open architecture and which may comprise a personal server, such as a cellular phone. The open architecture allows additional sensors to join the network, without rendering the personal server irrelevant.

Wireless communication in relatively close proximity to patients takes place nowadays predominantly by means of radio systems which utilize the entire electromagnetic field and usually operate in the far field. In the case of far field communication, the distance between a receiver and a transmitter antenna is greater than double the wavelength of the radio carrier frequency chosen. At 2.45 GHz, this is approximately 0.3 m. Diverse radio technologies are standardized under IEEE 802.11 and related standards. In this case, principal features are that an ISM frequency (Industry Science Medical, for example 2.45 GHz) is used and that with a limited transmission power of approximately 100 mW, for example, distances of approximately 1-10 m are bridged. ISM frequencies are generally accessible frequency bands, i.e. frequency bands not allocated by organizations or governments in accordance with strict rules. The only ISM frequency band that can currently be used without restrictions throughout the world whilst observing the presently applicable standards is the 2.45 GHz band.

Furthermore, systems are available that use only the magnetic field component. Only distances within the antenna near field can thereby be bridged, owing to physical conditions. Such systems are in use as RFID systems (Radio Frequency Identification, also called Transponders) or as NFC systems (Near Field Communication). RFID systems are distinguished by the fact that a so-called reader induces data and energy in a so-called transponder. The transponder modifies the data, if appropriate, and returns them to the reader again. The transponder is generally only active if it is situated in the influencing field of the energy of the reader. NFC works using the same structures and protocols as RFID, but in this case the transponder also comprises its own energy source, such that only the communication is activated by the reader, but the application can remain active even outside the influence of the reader. This is advantageous particularly in the case of distributed, continuously measuring sensor systems.

Communication systems which utilize only the electric field component of the electromagnetic field have also been known for some time. Owing to the breakdown strength of air, which is approximately 1000 V/mm, the electric field component can transmit at most only approximately 1/90 000 of the energy of the magnetic field (See e.g. K. Küfmüller et al.: Theoretische Elektrotechnik: Eine Einfürung, 10. Auflage, Springer Verlag, Berlin, S. 333. Therefore, the remote action component is in many cases limited to a direct touching contact.

However, it has been found here that a human body is relatively well suited to conducting dielectric displacement currents. The transmission of items of information is therefore possible without the latter leaving the conducting body over a wide area. Such networks which operate in the near-field range and utilize the human body for transmitting signals are known, in particular, in the field of applications for personal information and communication, for example from U.S. Pat. No. 6,542,717 B1, from T. G. Zimmerman: "Personal Area Networks (PAN): Near-Field Intra-Body Communication", master's thesis at the Massachusetts Institute of Technology, September 1995, or from M. S. Wegmüller: "Intra-Body Communication for Biomedical Sensor Networks", dissertation, ETH Zürich, 2007, where such networks are also referred to as PAN (Personal Area Network). Such networks use electric fields as a communication medium between transmitters which are arranged on persons.

Systems which utilize the human body for communicating signals are also known from the medical sector. Thus, U.S. Pat. No. 6,315,719 B1, for example, describes a system which can be used for long-term medical monitoring of a patient, for example an astronaut. In that case, an autonomous sensor unit is arranged on a person's body, said sensor unit having electrodes. These electrodes are arranged on the skin by means of an adhesive strip. Furthermore, a transmitter and receiver worn on the body is provided, which serves as a central unit.

In the field of diabetes diagnostics, in particular, previous developments have generally concentrated on the detection of a small number of individual parameters with direct diagnostic reference. By way of example, glucose from arterial blood or from the interstitium is measured. In this case, a treating physician is generally consulted as a control entity. Said physician also defines the therapeutic measures. Further diagnostic measurement variables or else personal experience and knowledge-based rules are included in this case.

As a result of the development of sensor technology, extended in-vivo diagnostics have become possible nowadays, for example as a result of the possibility of continuously measuring glucose concentrations. As a result of further miniaturization, the detection of various parameters in the blood, for example electrolytes, blood gases, chemical parameters or the like, stress parameters (for example diverse hormones), but also physio-physical parameters (e.g. blood pressure, heart rate, fat content, weight, temperature), becomes possible instantaneously or continuously. Such a system is described in WO 2004/039256 A2, for example.

Over and above these physically and/or chemically measurable variables, diagnosis and therapy are in many cases also influenced by personal factors such as well-being, stress and external influences such as, for example, the weather, time changes or the like, but also events such as eating, periods of sleep, sport or the like. Examples of systems which take account of such factors are described in US 2007/0238934 A1 or in US 2009/0131759 A1. From an overall assessment of the diagnostic values, therapy plans can then be created and implemented.

Suitable actuators make it possible nowadays to a limited extent to implement said therapy plans automatically, in a temporally coordinated manner. Examples of such actuators are an insulin pump, a medicament dispenser, triggering of physiological stimuli or the like.

Diagnostic systems of the type described above therefore consist of numerous complex individual modules with differing handling, start-up, calibration or similar requirements. Precisely in the field of patient self-diagnostics, therefore, it is often the case that simple and hence fault-tolerant start-up and control of the systems and subsystems by the user still do not exist. The construction of diagnostic systems and networks is additionally made more difficult by lack of interoperability or a complicated method of identification and assignment of system components. It is often necessary to manually input long series of numbers, parameters or items of time information, which can lead to a susceptibility of the systems to faults. Moreover, owing to hitherto substantially lacking sensor technology, the inclusion of extracorporeal events, such as eating, sleeping, sport or stress, for example, is generally possible only by manual inputting by the person respectively concerned. This may be associated with the corresponding inputting errors and also errors in the time reference. If a correct temporal assignment is not provided, this can give rise to large diagnostic errors, and the latter in turn to therapy errors.

If a plurality of sensors and/or actuators are intended to be combined to form a common system and are networked, then it is furthermore almost no longer possible for the layperson to coordinate these systems. Operating errors with serious consequences should be expected.

In WO 2007/096810 A1, a body area network ("BAN") is disclosed, comprising a plurality of devices, each device comprising means for detecting other similar communication devices. A method for setting up the BAN is disclosed, wherein a first sensor device is switched on and searches for other sensor devices by using a request. Since it is the first sensor device, there is no other sensor device responding to the request, and first sensor device is switched to a wait mode. Once a second sensor device is added and switched on, the second sensor device sends a request, which is answered by the first sensor by creating a BAN. The first sensor and a RF device included by this first sensor automatically takes over the role of the coordinator of the BAN.

The setup and method disclosed by WO 2007/096810 A1, however, has some significant shortcomings. Firstly, the role distribution of the setup is fixed in an arbitrary way in that the device, which accidentally is attached to the body first, automatically takes over the role of the coordinator of the network, independent from its physical nature, its hardware and software resources and independent from its requirements in terms of the type of data generated by the device. Since the roles in this network are pre-determined, a situation might easily occur in which the device least suitable for being the coordinator takes over this coordinator role of the network.

Similarly, EP 1 676 525 A1 discloses a medical device communications network comprising a plurality of medical devices having wireless communication circuits. A master wireless communications circuit may be comprised, which may receive medical device information from a plurality of slave wireless communication circuits. The devices exchange device identification codes. The network is set up to thereby monitor that appropriate instruments are matched with appropriate devices.

WO 2008/015627 A1 discloses a system comprising a plurality of network components and a network management device. The components are adapted to communicate by wireless short-range communication. The network management device comprises a body-coupled communication interface and is adapted to configure the plurality of network components by means of the interfaces to form a network and to avoid conflicts between the network components.

Again, as in WO 2007/096810 A1, the networks disclosed by EP 1 676 525 A1 and by WO 2008/015627 A1 have the technical shortcoming that the roles of the network devices are predetermined. Thus, in case there is a master device or management device, the role of this device as a network master is known from the beginning and remains unchanged during operation of the network. The network does not exhibit any flexibility regarding the fact that other devices may be added which might be more suited for taking over the role of the master device. Further, the fixed role-distribution generally is unable to react to changing needs and requirements within the network, such as to a situation in which a network node is added which requires a more time-critical data handling or which requires a modification of the allocation of hardware resources within the network.

SUMMARY

A method for setting up a medical network which at least substantially avoids the disadvantages of known systems and networks is provided. In particular, the method is intended to enable even complex networks comprising numerous network nodes to be set up by a layperson who is not medically and technically trained. Further, the method is intended to exhibit a high flexibility with regard to network components actually comprised by the network and the specific requirements, and with regard to changing compositions, needs and tasks of the network.

Accordingly, a method for setting up a medical network for carrying out at least one medical function is proposed. In this case, setting up can be understood to mean, in principle, creating, in particular producing, a new network. As an alternative or in addition, however, setting up can also be understood to mean reconfiguration of an already existing network, for example by one or a plurality of new network nodes being added to an existing network, by a new function being added to an existing network, by one or a plurality of network nodes being removed from an already existing network, or the like. Once again as an alternative or in addition, the term setting up can also encompass operation or part of operation of the medical network since, as will be explained in greater detail below, during operation, too, optimization of the network or improvement of the interaction of a plurality of network nodes can be effected, which shall also be subsumed under the term setting up the network.

In this case, in the context of the present invention, a network should be understood to mean a device comprising at least two, and possibly three, four or more, network nodes. The network nodes respectively comprise at least one device which is set up for carrying out at least one node function. Examples of such functions are explained in greater detail below. The network nodes can be physically connected to one another. All or at least two, three or more of the network nodes are set up for communicating with one another in a wireless or wire-based fashion.

The medical network can be, in particular, a near-body network, that is to say a network in which one, two or more of the network nodes are arranged on, in or in direct proximity to a body of the user, such that said network nodes, on account of the proximity to the body, are set up, for example, for detecting at least one parameter of the body and/or for influencing at least one body function and/or for communication via the body and/or for carrying out similar functions for which spatial proximity to a body of a user is required. By way of example, at least one, and possibly two, three or more, of the nodes can be arranged at a distance of not further than one metre from the surface of a body of the user, such as not more than 50 cm and particularly preferably not more than 10 cm from the body of the user, during the operation of the medical network, or, alternatively or additionally, into the body of the user, e.g. by way of implantation into the skin.

The network nodes are set up for communication with one another. This means that at least two of the network nodes are set up for communication with one another, such as a plurality of the network nodes, and in particular all of the network nodes. The communication can be configured in each case in a unidirectional or bidirectional fashion. As explained above, the communication can be provided for example in a wireless fashion, in a wire-based fashion or else in a manner incorporating the body of the user.

The method for setting up the medical network comprises at least the steps presented below. The steps presented can preferably be carried out in the order presented. However, in principle, the steps can also be carried out in a different order, in a temporally overlapping fashion or even temporally in parallel. By way of example, parts of the network can already undergo transition to a subsequent method step, for example the work step, while other parts of the network are still in a preceding step of the method, for example in an initialization step or self-organization step. The steps of the method are therefore intended to relate at least to part of the network, that is to say at least two of the network nodes. Other network nodes can be excluded from the method. Furthermore, it is pointed out that the term method step can include a short duration of this step, but that a more lengthy implementation of the steps is also possible. Accordingly, individual or a plurality of the method steps described below can also be configured as a "phase" of the method and be implemented in a lengthier fashion. By way of example, the network can be set up for effecting the medical function of the network over a duration of a number of minutes, a number of hours or even a number of days, for example seven days or more, for example in the work step described below. A longer duration of the self-organization step and/or of the initialization step and/or repeated implementation of one or both of these steps is also conceivable, in principle, as is repeated implementation of the work step described below.

The method proposed comprises at least one initialization step. In this case, an initialization step should be understood to mean a step in which at least two of the network nodes exchange at least one item of initialization information. This exchange can be effected in a unidirectional or else once again bidirectional fashion. In this case, the initialization information is intended to comprise at least one item of information characterizing the network nodes which are involved in the initialization step, or at least one of said network nodes, preferably at least two of said network nodes. The initialization information therefore makes it possible for at least one of the network nodes to set itself, part of the entire network or the entire network with regard to the particular features of the network node whose information is contained in the characterizing information. The initialization step can take place in particular according to predetermined rules, in particular deterministically, for example according to a predetermined protocol. However, other configurations are also possible, in principle.

Furthermore, the method comprises at least one self-organization step, which can be carried out after the conclusion of the initialization step. A temporal overlap with the initialization step is also conceivable, but the self-organization step can begin after the initialization step. In the self-organization step, the network nodes, that is to say, for example, two, three, several or even all of the network nodes of the medical network, define a role distribution of the network. Said role distribution can relate to different aspects of a subsequent interaction for carrying out the at least one medical function, for example division of the resources, reciprocal control, communication among one another or communication with at least one element outside the medical network, or the like. Examples will be explained in greater detail below.

Furthermore, at least one work step is carried out. The at least one work step can be carried out after the initialization step has been carried out and/or after the self-organization step has been carried out, or after the beginning of one or both of these work steps. Since, as explained above, parts of the network can carry out the method steps at different points in time, or since only parts of the network may be involved in carrying out the method, other parts of the network may, however, also already commence the work step while further parts of the network are still in the initialization step and/or in the self-organization step. In the work step, the network carries out the at least one medical function. When carrying out this at least one medical function, at least two of the network nodes interact in accordance with the role distribution defined in the self-organization step.

The method according to embodiment of the invention overcomes the above-mentioned shortcomings of the methods and networks known from the prior art. Thus, in contrast to the method disclosed by WO 2007/096810 A1 which simply discloses the transmission of a "wakeup" call once a new sensor is added to the network, the present invention comprises the at least one initialization step in which the at least one item of information characterizing the network nodes is exchanged. In contrast to the predetermined role distribution as disclosed by WO 2007/096810 A1, by EP 1 676 525 A1 and by WO 2008/015627 A1, the method of the present invention further comprises the self-organization step in which the role-distribution of the network nodes is defined. The item of information characterizing the network nodes, as exchanged during the initialization step, may form a solid basis for the self-organization step.

Thus, the role distribution may be defined by making use of this information characterizing the network nodes, such as by attributing the roles to the network nodes which are most suited for the specific role. Thus, the at least one item of information characterizing the network nodes may be compared. This comparison, which may be part of the self-organization step and/or of one or more other steps, may be performed by one or more of the network nodes. Thus, the method can comprise at least one comparison of the at least one item of information characterizing the network nodes, wherein the definition of the role distribution of the network nodes may at least partly be based on a result of this comparison. In this comparison, the present situation of the network may be analyzed, including an analysis of hardware and/or software resources available and/or an analysis of requirements and needs, as well as an optional analysis of the one or more medical functions to be performed in the work step.

As an example, the self-organization step may be carried out in such a way that the role distribution comprises a determination of at least one network node as master node and a determination of at least one network node as slave node. One or more network nodes may be capable of taking over the role of the at least one master node. The master node may be adapted to control one or more functions of the slave node. This determination might be adapted to change during operation of the network, e.g. in reaction to a change in composition of the network and/or in reaction to a change in one or more of the medical functions to be performed by the network. As outlined above, the determination may make use of the at least one item of information characterizing the network nodes and may be based on a comparison of this at least one item of information. Thus, the network node having the most powerful hardware resources may be defined as the master node. The term most powerful hardware resources may refer to the fact that the master node may be chosen such that the master node has a computing device, such as a microcontroller, having the highest frequency amongst all network nodes. Alternatively or additionally, the master node may be the network node having the highest data storage capability amongst all network nodes. Again alternatively or additionally, the network node having the most powerful and/or the fastest communication capabilities may be defined as the master node.

Alternatively or additionally, the definition of the roles may be based on one or more functions to be performed by the nodes, such as by the at least one medical function. The at least one item of information characterizing the network nodes may comprise information regarding this at least one function, and, thus, the comparison discussed above may comprise a comparison of the functions and/or of the needs of the network nodes and/or a comparison of the hardware and/or software requirements and/or a comparison of the sensitivity of the functions. The latter can e.g. comprise a comparison of the need of speed for data transmission. Thus, generally, the network node having the most time critical function may be defined as the master node. Herein, time-critical may refer to the fact that the function to be performed by the master node may imply the need for the fastest transmission and/or receiving of data and/or control commands amongst all network nodes. This may e.g. be the case for medical functions such as sensor functions, which might generate abnormal results requiring immediate attention by a user and/or a doctor. Thus, alternatively or additionally to the possibilities listed above, the network node having the most sensitive medical function and/or having the most time-critical data transmission requirements may be chosen as the master node.

Other roles besides master and slave roles are possible. Thus, one or more network nodes can take over the role of a storage device for the medical network and/or for a part of the medical network, such as one or more network nodes having the highest data storage capability. Similarly, one or more network nodes can take over the role of a communicator with one or more devices outside the medical network. Thus, this communicator role can be taken by one or more network nodes having the highest and/or fastest data transmission capability.

Other possibilities regarding the role distribution are feasible. Optionally, the at least one self-organization step can be performed repeatedly, such as to keep the role distribution flexible during operation of the medical network. Thus, the role distribution can be adapted to changing functions to be performed by the medical network and/or to a change in composition of the network, such as by adding and/or removing one or more network nodes. Generally, the method may be adapted to change the role distribution of the network nodes during operation of the medical network.

In the context of embodiment of the invention, the term medical should generally be understood to mean identification of body states and/or detection of specific parameters of a body of a user, in particular a diagnostic property, and/or influencing the body of the user in any desired fashion, in principle, for example by exerting at least one physical and/or chemical and/or biological and/or environmentally governed stimulus. Accordingly, a medical function of the network is a function which yields at least one medical result and/or yields at least one medical stimulus or medical influencing within the meaning of the above definition of medical. In particular, the medical function of the network can comprise at least one of the following functions: a sensor function for detecting at least one measurement variable of a body, of a user, in particular a diagnostic function. This can be, in principle, any function in which at least one body state, at least one physiological parameter or other variable characterizing a state of a body of a user is detected. Examples that shall be mentioned here include continuous or discontinuous measurement and/or qualitative or quantitative detection of one or a plurality of analytes, for example detection of glucose in one or a plurality of body fluids, detection of various parameters in the blood such as, for example, electrolytes, blood gases, chemical parameters, detection of stress parameters (for example by detecting one or a plurality of hormones), detection of physio-physical parameters such as, for example, blood pressure, heart rate, fat content, weight, temperature, or a combination of the stated and/or other measurement variables. The detection can be effected spontaneously or else continuously. Furthermore, it is also possible to detect factors which can bring about well-being, stress or external influences on the body of the user, but also events such as eating, periods of sleep, sport or the like. In this regard, reference may be made for example to the prior art described above.

As an alternative or in addition to the detection of at least one measurement variable, the at least one medical function of the network can also comprise an actuator function for exerting at least one effect on a body of the user. This can be, in principle, any desired effect, in particular exerting a stimulus on the body which is suitable, in principle, for altering at least one body state and/or for effecting a therapy function. In particular, this can be a chemical and/or pharmaceutical stimulus and/or a physical stimulus, for example administration of a medicament, exertion of an electrical stimulus, exertion of pressure, exertion of temperature (heat or cold) on the body of the user or the like. In particular, the at least one actuator function can be a medication function and/or the actuator function can comprise such a medication function. Thus, e.g., the actuator function may comprise the function of an insulin medication, such as the function of an insulin pump. Alternatively or additionally, however, other actuator functions can be present.

The medical network is thus set up, in particular after the method described has been carried out, for carrying out at least one medical function. Furthermore, at least one, and possibly two, three or more of the network nodes can be set up for in turn carrying out a node function. In this case, a node function is a function which an individual network node or an assemblage comprising a subset of the network nodes can carry out independently, if appropriate with provision of an external energy source and/or after external instigation to carry out this function, for example an external trigger. With regard to said node function, reference may be made, in principle, to the description of the network function since, by way of example, the individual network nodes can also carry out the above-described functions, individually or in combination as node functions. By way of example, the at least one node function can comprise at least one of the following node functions: a sensor function (for example a diagnosis function, wherein reference may be made by way of example to the above-described sensor functions of the network, in particular to the diagnosis functions), an actuator function, in particular a medication function or the like. Other functions from among those described above can also be carried out as an alternative or in addition. Furthermore, the at least one node function can comprise at least one communication function for exchanging items of information with at least one element not assigned to the network. Said items of information can comprise, for example, data, control commands or the like; in particular, the at least one node function can in this case comprise an interface function, for example a wire-based communication function, wireless communication function or communication function that operates via a body of the user. In particular, a Bluetooth and/or infrared interface can be included.

As an alternative or in addition, the at least one node function can comprise at least one communication function for exchanging items of information with at least one user. This exchange can be effected in a unidirectional or bidirectional fashion. By way of example, the at least one item of information, which can in turn also comprise control commands, for example, can comprise visual, acoustic, optical or haptic data outputs, for example by means of a display. As an alternative or in addition, data inputting or inputting of control commands can also be included, for example by means of one or a plurality of operating elements or the like.

Once again as an alternative or in addition, a data processing function can be included. This can be effected for example by implementing one or a plurality of microprocessors. Once again as an alternative or in addition, a data storage function can also be included, for example by means of at least one volatile and/or non-volatile data memory. Furthermore, likewise once again as an alternative or in addition, at least one energy obtaining function for generating energy from an environment of the network node, for example from a body of the user, can be included. In this respect, so-called energy harvesting, for example, can be provided in order, for example, to obtain energy for the whole network or parts thereof, such as for the specific network node, from the environment and/or a body of the user by way of vibrations, heat, pressure or similar stimuli.

Once again as an alternative or in addition, the at least one node function can be at least one clock function for providing a real time. In particular, a UTC (Universal Time Coordinated) can be provided, that is to say a presently applicable world time. The latter is generally generated from a time derived by an atomic clock and generates an identical counter reading throughout the world. Said reading is generally independent of time zones or date lines. By means of this counter, it is possible, for example, for events to be temporally exactly synchronized identically throughout the world, including in medical technology. The local times can be derived therefrom by means of an algorithm.

As explained above, the medical network can be set up completely or partly as a so-called body area network (BAN). In this respect, reference may be made, for example, to the prior art described above. Accordingly, by way of example, two or more of the network nodes can be set up for communicating with one another via a body of a user as signal transmission medium. Accordingly, the network nodes can have corresponding electrodes, for example, in order to couple electrical signals and/or electromagnetic signals into a body of the user or onto a body of the user and/or to couple said signals out of said body.

Further preferred configurations of the method relate to the initialization step. This initialization step can itself comprise a plurality of sub-steps. By way of example, the initialization step can comprise, alongside the above-described exchange of the at least one item of initialization information, at least one boot step, that is to say a step in which elementary functions of the network node itself are initialized without the network node in this case necessarily being connected to other network nodes. Boot steps of this type are known, in principle, from the field of the designing of electronic devices.

As explained above, the method for setting up the medical network can be set up, in particular, for incorporating new network nodes into the network. This can be effected in the context of a so-called plug-and-play concept, for example.

Accordingly, the initialization step can be configured for example in such a way that, in this step, at least one network node which is to be newly inserted into the network is physically assigned to the network. This physical assignment can in one instance comprise a process in which the network node which is to be newly inserted is brought spatially close to an already existing partial network or into an already existing network, for example a process of bringing it close in such a way that a near-body network communication can take place. As an alternative or in addition, an active incorporation can also be effected, for example by means of the network node which is to be newly inserted being actively logged on to the network and/or at least one network node of the already existing network. This logging-on can be effected by means of so-called pairing, for example, that is to say a process in which a communication between the network node which is to be newly inserted and the network or a part of the network is permitted. The pairing can be effected for example by the inputting of a code, a specific user action that deviates from normal operation, a specific type of the process involving bringing said node spatially close in a certain way which usually would not occur during normal operation of the network, an exchange of items of pairing information, or the like, preferably by a user's action.

The logging-on and/or the pairing can comprise one or more means for providing an authentication and/or for providing a pre-defined level of privacy. Thus, during logging on, e.g. by providing an exchange of one or more log-on codes (such as uni-directionally or bi-directionally between one node to be added to the network and at least one node of the network already existing), it might be ensured that no network node is added to the network which is not supposed to enter the network, such as a network node from a different user getting close to the actual user of the network concerned.

Similarly, the method can provide one or more steps for ensuring privacy of the network and/or the user. Thus, the method and/or the network may provide means adapted to prevent other users and/or other devices to retrieve information from the network or from one or more of the network nodes. Again, this feature can be realized by unidirectional or bidirectional exchange of authentication information and/or one or more passwords.

The method can then be carried out in such a way that the network node which is to be newly inserted exchanges the at least one item of initialization information with at least one network node already present in the network. Accordingly, by way of example, when a new network node is incorporated into an already existing network, the initialization step can be carried out anew. In addition, it is optionally possible for the at least one self-organization step to be carried out anew before a transition is then made preferably to the work step.

As described above, the initialization information can comprise at least one item of information characterizing the network nodes or at least one network node involved in the initialization of the network. In particular, the initialization information can comprise at least one of the following items of information: an item of information about a type of at least one of the network nodes, for example a sort of the network node, a manufacturer, a date of manufacture, a purpose of use, or the like; an item of information about a function of one of the network nodes, in particular about a medical function, that is to say an item of information about the purpose for which the network node can be used, for example an item of information about a node function of the network node; an item of information about a configuration of hardware resources of one of the network nodes, in particular about a data storage device and/or a data processing device of one of the network nodes; an item of information about a communication protocol of one of the network nodes, for example a communication standard or the like; an information about a pre-configuration, in particular an information on a calibration and/or a mathematical set-up. The initialization information can comprise in particular specifically one or a plurality of the network nodes involved in the initialization step. By way of example, the initialization information can relate specifically to the network node which is to be newly incorporated into the network. However, further configurations are also possible, in principle, for example configurations in which the network node which is to be newly incorporated acquires items of information about other network nodes.

Further advantageous configurations of invention embodiments relate to the configuration of the self-organization step. In principle, in the self-organization step, it is possible to have recourse to known concepts for the self-organization of networks or complex systems. In systems theory and also in the context of the present invention, self-organization denotes, in principle, any form of system development in which the shaping and/or configuring and/or restricting influences emerge from the elements of the self-organizing system itself, in this case from the network nodes. Accordingly, a self-organizing system generally has the properties of complexity, self-reference, redundancy and autonomy. By way of example, it is possible to have recourse to software programs having non-defined (deterministic) program flows, for example to program flows having fuzzy rules.

In the context of the present invention, self-organization serves to define a role distribution of the network nodes of the network. The role distribution is, in principle, any desired scheme which defines the cooperation of the network nodes in the subsequent work step. In this case, the self-organization can be configured to the effect that the role distribution is coordinated optimally or at least well for example with the type of the network nodes, with the communication capability thereof, with the resources thereof and with the node functions thereof. By way of example, the role distribution can comprise at least one of the following definitions: determination of at least one network node as master node, that is to say as node which at least temporarily controls at least one other node (slave node); determination of at least one network node as slave node, that is to say a controlled node; utilization of at least one resource of a first network node by at least one second network node; an interaction of at least two network nodes for carrying out at least one function which cannot be achieved individually by the network nodes; a dynamically adaptable set of role distributions. Other role distributions are also possible, in principle. The latter of the listed possibilities demonstrates that the role distributions of some or more of the network nodes may change during one or more of the steps of the method, such as during the work step. At least one item of information about the role distribution can be stored in at least one data storage device of at least one of the network nodes. By way of example, this can involve an item of information about existing resources, an item of information about existing functions or node functions, an item of information about a communication protocol or about available communications or the like. It is particularly preferred if the at least one item of information about the role distribution is stored in a plurality of data storage devices on a plurality of network nodes, that is to say that redundant data storage is effected. Redundant data storage can be utilized for example for the purpose that, when one of the network nodes is removed from the network, the information about the previous role distribution is still available with high probability.

In a further embodiment of the invention, the self-organization step may be performed in a controlled way, i.e. in such a way that one or more of the results of the self-organization step are at least partially cross-checked with and/or controlled by: one or more boundary conditions and/or a superordinate authority. Thus, e.g. by pre-determining a fixed set of rules which may not be exceeded or violated, may be provided. The rules generated during the self-organization step may be cross-checked against this fixed set of rules. The superordinate authority may be an external computer or computer network or even an external expert, such as a doctor or nurse, which might be consulted automatically by the network, in order to cross-check the rules generated during the self-organization step.

The method can furthermore comprise at least one log-off step. In the log-off step, which can, for example, also interrupt one of the steps mentioned above, at least one network node is removed from the network. This removal may take place in several ways, such as by a controlled removal of the at least one network node by a user or by a failure-induced removal of the network node. The first case may e.g. be announced or transmitted to the network or part of the network by the user himself, such as by initiating a controlled "un-pairing" action. This un-pairing may include one or more steps similar to the pairing action as described above, such as a user action which usually would not occur during normal operation of the network, an exchange of un-pairing information or the like. This un-pairing step may induce or announce a controlled removal of the network node by the user. Further, alternatively or additionally, the network or parts thereof (such as at least one network node remaining in the network) may be adapted to detect the removal of one or more network nodes by itself, especially automatically. Thus, the removal of one or more network nodes may be detected in the log-off step by at least one network node remaining in the network, for example by means of a corresponding log-off identification step. After the log-off step, the self-organization step is then carried out anew in order to newly define a role distribution of the remaining network or of the remaining network nodes. In addition, it is optionally also possible for the at least one initialization step to be carried out anew, although this is not generally necessary since the initialization information of the remaining network nodes is generally present. The new role distribution of the remaining network can relate, for example, to altered resources, altered network or node functions, altered master-slave role distribution, altered communication structures or the like.

Optionally, the method can in this case be carried out in such a way that a warning is issued to a user if, in the renewed self-organization step, it is identified that a sufficient functionality of the remaining network no longer exists. This warning can be issued for example directly to a user, for example by means of a corresponding user interface (e.g. a display, see the description above), and/or indirectly by means of at least one external element, for example a computer element connected to the network.

The method can be carried out in particular in such a way that the removal of the at least one network node from the network is identified by interrogation of the presence of the network node by at least one further network node and/or by the absence of an expected signal of the network node. By way of example, the at least one further network node can send interrogation signals to the network node at regular or irregular intervals, wherein said interrogation signals can be sent to one or a plurality of the network nodes. Said interrogation signals can bring about in regular operation, for example, a response of the respective network node signalling the presence of the network node. By way of example, a star-type structure, a tree-type structure or a structure organized in some other way can be realized, in the case of which respectively one or a plurality of network nodes send such interrogations to one or a plurality of other network nodes. If a response signal of the interrogated network node fails to appear, then for example removal of the network node from the network can be deduced from this. In this case, removal should be understood to mean physical removal from the network and/or moreover a failure of the respective network node, for example by virtue of the occurrence of a malfunction of the network node or a collapse of an energy supply of the network node. As an alternative or in addition to interrogation of the presence of the network node, the removal of this network node can also be identified by absence of an expected signal of the network node. Thus, by way of example, it is possible to provide a communication scheme in which each network node or at least one of the network nodes communicates signals to at least one further network node at regular or irregular intervals. If these expected signals fail to appear, then the removal of the network node whose signal has failed to appear from the network can be deduced from this. Various other schemes for identifying the removal of the network node from the network are conceivable.

The work step of the method according to the present may further be executed at least partly in a self-learned and/or self-trained way. Thus, in this embodiment, one or more of the network nodes or even the whole network may perform one or more functions during the work step in a way that is not or at least not fully pre-determined before the operation of the network, but instead may be determined by a self-learning process and/or self-training process. This self-learning process and/or self-training process may be performed in such a way that the way of operation of the network or of one or more of the network nodes is adapted to the boundary conditions, such as by an optimization procedure. Thus, the self-learning may evaluate, e.g. by trial and error or by evaluating first results of the network operation, the boundary conditions or the functioning of the network and may improve or even optimize the setup of the network, e.g. by using an iterative process.

One particular feature of the production of medical networks comprising a plurality of network nodes consists in the fact that the medical network can be set up for performing at least one medical function which goes beyond the sum of the individual functions of the network nodes. In other words, the network nodes may cooperate in such a way that the network may perform at least one function or task which would not be possible by the network nodes alone, but which is enabled by a synergetic cooperation of the network nodes. In this way, by way of example, synergistic effects of the network nodes can be utilized, for example by signals of different network nodes being combined in order to generate new items of information, by actuators and sensors being interconnected to form control loops, or in some other way. Accordingly, it is particularly preferred if at least two of the network nodes are in each case set up for performing at least one node function, for example one or a plurality of the node functions described above. In this case, a network node can also be set up for performing a plurality of such node functions. The self-organization step and the work step can then be carried out in particular in such a way that the function of the network, in particular the medical function, comprises at least one further function which goes beyond the sum of the node functions. Said at least one further function can comprise, for example, at least one of the following functions:

provision of an item of information, wherein the information is generated by combination of at least two measurement variables of at least two network nodes;

driving or controlling of at least one first network node by at least one second network node, such as by setting up a master-slave-system;

a control function, wherein at least one first network node with an actuator function is subjected to open-loop and/or closed-loop control by the comparison of at least one measurement value of at least one second network node with at least one measurement function with at least one desired value.

A combination of the above-mentioned, further functions and/or other functions is also conceivable. In principle, it is also possible to imagine other synergistic effects between the node functions and to realize them in the context of the present invention.

In a further aspect of the present invention, the method comprises at least one monitoring step. This monitoring step can be carried out for example in parallel with the other method steps, in temporally overlapping fashion, intermittently (for example at regular or irregular intervals) or at the same time. The monitoring step can be configured for example as the topmost entity of the network and/or can be realized for example in the background on one, a plurality or all of the network nodes and/or on a master node. The monitoring step is set up for monitoring at least one result of the self-organization step and/or of the work step and for carrying out at least one fault routine upon identification of a deviation from a standard or of an anomaly. A typical deviation can consist, for example, in a role distribution deviating from a multiplicity of possible predetermined role distributions in such a way that a fault must be present in the self-organization step. Furthermore, by way of example, a plausibility consideration can be carried out in order for example to compare results of the work step and/or of the self-organization step with specific limit values or limit functions and/or a plurality of predetermined results. In this way, by way of example, oscillations of the system such as can occur in self-organizing systems can be identified. A corresponding standard with which comparison can be made can be stored for example in the form of one or a plurality of standard values and/or standard functions and/or possible standard states in at least one data storage device of at least one network node. The monitoring step can be carried out on one or a plurality of network nodes, for example, as explained above, a master node and/or a network node specifically configured for this task.

The background of this configuration is that medical systems, for example diagnostic and/or actuator-appertaining networks, nowadays generally consist of complex individual modules with different handling in start-up, calibration and the like. This means, however, that the self-organization and the subsequent standard operation of the medical network generally have to be subjected to a specific control, which can function as a last entity, for example, and which can intervene in the medical network in a regulating fashion before unexpected states and/or functions which cannot be predicted from the individual network nodes occur. In this way, it is possible to identify and, if appropriate, prevent for example non-plausible role distributions as a result of the self-organization step and/or non-plausible functions of the network or of individual or a plurality of network nodes.

Upon identification of a standard deviation, the monitoring step carries out at least one fault routine. In this case, a fault routine should be understood to mean a regulating intervention in the function of the medical network and/or the function of at least one of the network nodes and/or a regulating intervention in the role distribution. The fault routine can comprise for example one or a plurality of the following measures: an intervention in the role distribution (for example a reorganization of a master-slave assignment, a reorganization of the resource utilization or the like); an activation and/or deactivation of one or a plurality of network nodes; an issuing of a warning to a user and/or an element not assigned to the network (for example an external computer connected in a communication link to the network, for example); an intervention in at least one function of the network; a deactivation of the network or at least one network node. Combinations of the abovementioned measures and/or of other measures are also possible, as is a different configuration of the fault routine.

In addition to the method in one or more of the configurations described above, a medical network for carrying out at least one medical function is furthermore proposed. The medical network comprises at least two network nodes, and can include three, four or more network nodes, wherein at least two of the network nodes are set up for carrying out a method according to any of the preceding claims. Accordingly, with respect to the medical network, reference may be made to the above description of the method.

The proposed method and also the proposed medical network have numerous advantages over known methods and networks. Thus, it is possible to realize even complex medical networks in which two, three or more network nodes interact with their node functions, such that synergistic effects that go beyond the individual functions of the network nodes can be utilized. As an alternative or in addition to deterministic rules for controlling the network, the self-organization of the network can follow fuzzy rules, for example, in particular rules which lead to results which are not predictable on the basis of the properties of the individual network nodes.

The medical network can be configured for also detecting extracorporeal events, such as eating, sleeping, sport and stress, for example, and concomitantly incorporating them into the functionality.

The network can be set up, in particular, for ascertaining and/or maintaining and/or influencing body states. Self-organizing, self-learning and self-synchronizing structures can be realized in this case. In the case of the network, the plug-and-play concept, in particular, can be supported in such a way that a user, for example a patient or a care giver, only has to perform a small number of measures during the initial application, during expansion or during reconfiguration or reconditioning, such as, for example, calibrations or manual supports.

The medical network, for example by virtue of the provision of a communication network node having at least one communication function for communication with an element outside the network, can also, automatically link into superordinate systems or superordinate networks, authenticate itself and, if appropriate, log off again. This can be done for example at the level of the link layer and the protocol layer according to the OSI 7-layer standard. A possible rejection of the network can also be realized.

The self-learning system network nodes can have, upon start-up, a deterministic start rule set in order to perform basic functions. This can be effected for example in the context of the initialization step, for example in the context of a boot step of the initialization step. The start rule functions and/or basic functions can be utilized, for example, in order to produce a defined start state of the entire network, of a part of the network or of individual network nodes of the network. Furthermore, in this way, establishment of communication can be initialized, hardware drivers can be loaded, or the like.

From the data collected since the start-up of the network, the network or individual or a plurality of the network nodes, for example self-learning isolated modules, can for example also collect experiences, assess the data and, in a manner resulting therefrom, if appropriate, independently alter rules and adapt and even alter initial modes of behaviour or the role distribution. By way of example, the self-organization step can be carried out repeatedly, for example by the processing of results of the work step, which can likewise be carried out repeatedly, in order to adapt and, if appropriate, to optimize the role distribution.

If further network nodes are added, for example self-learning and/or determined modules, then the behaviour of individual modules, of a plurality of modules or of the entire network can change further from the knowledge of all or new system properties and this can in turn have reactions on individual modules and/or the entire network. Such a system corresponds to a feedback and/or positive feedback system and generally requires rules and criteria, for example stability criteria similar to those of closed-loop control technology, for damping in order to avoid oscillations, for example. Such functions can be implemented in particular in the context of the monitoring step described above.

Network nodes which enter into operation near-instantaneously or temporally at long intervals establish a link with one another and then generally undergo self-organization. This can comprise for example the definition of master and slave roles and/or priority levels, which can be defined in the context of the role distribution. Priority levels can for example initially be defined beforehand, for example on the basis of the predefined tasks, but can also change in the course of time, for example as a result of experiences or on account of the present data position. Master and slave roles can also change dynamically, for example on account of a suddenly increased amount of data, on account of which the master can temporarily hand over the organization tasks to a different module. The tasks can, in principle, be divided among the network nodes temporarily or permanently.

Network nodes having actuator functions can also be included in the learning process. Thus, by way of example, the stimuli of the actuators can be altered, if appropriate, on account of the items of information from the networked sensor modules. Furthermore, experience- and knowledge-based linkages and derivations of rules and conclusions can be carried out, for example in the context of so-called expert systems. Expert systems have already become established, in principle, in the field of medical technology.

In principle, the network, all the network nodes or else one or a plurality of the network nodes can be subjected to a superordinate, also extracorporeal calibration concept. Accordingly, the network or individual or a plurality of network nodes can also be set up in such a way that calibration values are communicated to the network from outside, for example in the context of a hierarchy, wherein the calibration values have a high prioritization. For this purpose, the network can have a communicator module as network node, for example, by means of which module calibration values of this type can be input. The network can be prioritized for example in such a way that such calibration values impressed from outside have to be accepted. Moreover, by way of example, rules for the organization of interventions by authorized outsiders, for example a physician and/or a helper, can be created, and can be communicated to the network nodes or to individual network nodes. This can be done for example in the context of a production step and/or in the at least one initialization step. Said rules can be configured for example in such a way that, in the case of occurrence of an intervention by an outsider having corresponding authorization, said rules permit such an intervention.

In the context of the monitoring step described above, it is possible to create and implement suitable validation methods for changing programs and self-organizing systems in the medical network. Thus, by way of example, it is possible to test the change threshold to which there is reaction and whether these reactions of the network and/or of individual or a plurality of network nodes are then actually plausible, for example by checking their conformity with generally valid rules. If the modes of behaviour of the network or of individual components or system parts deviate from long-term empirical values or behaviour, then it is possible to discriminate faults from the network nodes, for example on the basis of mathematical algorithms, and spontaneously to derive fail-safe measures or to generate fault messages. This can be done for example in the context of the fault routine described above. In the worst case, this can culminate in a shutdown of individual network nodes or of the entire network, or in messages on external display devices. Defective states should possibly also be communicated to the user or the environment by means of suitable stimuli. By way of example, stimulators such as a vibrator, electrical stimulation, light signals or the like can be provided for this purpose. The degree of discrimination can in turn be adapted depending on what is learned, and can be adjustable by external authorities, for example experts.

Modules of complex systems do not necessarily have a real-time clock. In the context of the proposed network, however, one, a plurality or all of the network nodes can be configured with such a real-time clock (RTC). The availability of real time may be necessary and may be used within the present invention for synchronizing two, more than two or even all of the activities and/or functions within the network. Particularly in the context of realizing near-body networks, in particular BANs (Body Area Network), however, at least one real-time system of this type should be integrated in the context of the present invention. Accordingly, it is particularly preferred if at least one of the network nodes, as explained above, comprises such a real-time clock. This can be either a defined module or a defined network node, or an allocation can be effected in the context of the self-organization step, for example. Such a network node having a real-time clock should have specific hardware for this purpose. Said hardware either provides an uninterrupted energy supply for operating the real-time clock directly after the production date, or obtains the real time after start-up from an external reference time system (for example via a PC, a network, the Internet, GPS, a radio controlled clock or the like), for example by direct contact to the outside or via a network node with a communicator module.

In the context of the proposed network, synchronization with a secondary event can also be effected. In this way, by way of example, sporting activities, mastication, swallowing or the like can be detected, for example by means of specific network nodes having sensor modules set up for this purpose. By way of example, provision can be made of one or a plurality of network nodes having acoustic sensors which identify the type of food on the basis of mastication noises and/or detect the amount of food on the basis of swallowing peristalsis. By way of example, in this respect, reference may be made to O. Amft: Automatic dietary monitoring using on-body sensors: detection of eating and drinking behaviour in healthy individuals, dissertation ETH Zürich, 2008. Network nodes of this type can also optionally be introduced into the network and act for example in accordance with the primary modules. If modules are not available, such items of secondary information can, however, can still be inputted manually by means of an external communicator, for example.

The network comprises, as explained above, preferably at least one network node which is set up for performing a communication function for exchanging items of information with at least one user. Such a network node can also be referred to as a communicator module or be configured as a communicator module. This network node can maintain contact with the environment, for example. This can be effected for example by means of free field radio, that is to say by means of a radio system in which the electromagnetic wave is completely released from the antenna. Such an interface can correspond to suitable and known radio standards, for example Bluetooth, W-LAN, IEEE 802, but can also have a proprietary nature. Near field communication (NCF) can also be used, that is to say communication in which only the magnetic field component is utilized. As an alternative or in addition, optical transmission links are also conceivable, but they are preferably not used in the case of subcutaneous nodes of the network since such optical transmission links generally necessitate a visual link.

Within the network, specific protocols can exist, for example, which can preferably likewise be modified as required. Communication protocols between the communicator module and the environment can be configured in accordance with customary standards, for example.

Furthermore, the network can also be set up for carrying out logging. For this purpose, by way of example, one or a plurality of the network nodes can have a logging function, such as a data logging function, for example in the context of so-called data logging. By way of example, program and rule modifications of the self-learning network can be concomitantly logged for control and verification purposes, in which case corresponding compilation possibilities can also be provided. The data logging function specifically may be provided for compliance purposes.

Furthermore, in the case of the individual network nodes or modules, there can be a possibility of learning modes of behaviour of third-party products, even if these are defined deterministically, if appropriate, and of concomitantly incorporating them into their own rules, or of integrating such modules in the network. This results in a high degree of interoperability. In this way, it is also possible, for example, for such learning procedures to be carried out interactively, for example in a manner controlled by a user.

Summarizing the Findings Above:

Item 1: A method for setting up a medical network for carrying out at least one medical function, wherein the medical network comprises at least two network nodes wherein the network nodes are set up for communicating with one another, wherein the method comprises at least the following steps:

at least one initialization step, wherein at least two network nodes exchange at least one item of initialization information in the initialization step, wherein the initialization information comprises at least one item of information characterizing the network nodes;

at least one self-organization step, wherein the network nodes define a role distribution of the network nodes;

at least one work step, wherein the network carries out the at least one medical function in the work step, wherein at least two of the network nodes interact in accordance with the role distribution defined in the self-organization step.

Item 2: The method according to the preceding item, wherein the role distribution is defined by making use of the at least one item characterizing the network nodes.

Item 3: The method according to any of the preceding items, wherein the method comprises a comparison of the at least one item of information characterizing the network nodes, wherein the definition of the role distribution of the network nodes at least partly is based on a result of this comparison.

Item 4: The method according to any of the preceding items, wherein the self-organization step is carried out in such a way that the role distribution comprises a determination of at least one network node as master node and a determination of at least one network node as slave node.

Item 5: The method according to one of the preceding items, wherein the network node having the most powerful hardware resources is defined as the master node.

Item 6: The method according to one of the two preceding items, wherein the network node having the most time-critical function is defined as the master node.

Item 7: The method according to one of the three preceding items, wherein at least two network nodes are capable of taking over the role of the master node.

Item 8: The method according to any of the preceding items, wherein the role distribution relates to at least one of: a division of resources; a reciprocal control; a communication among one the network nodes; a communication with at least one element outside the medical network.

Item 9: The method according to any of the preceding items, wherein in the self-organization step at least two of the network nodes, preferably at least three of the network nodes and most preferably all of the network nodes of the medical network, define the role distribution of the medical network.

Item 10: The method according to any of the preceding items, wherein the method is adapted to change the role distribution of the network nodes during operation of the medical network.

Item 11: The method according to any of the preceding items, wherein the medical function of the network comprises at least one of the following functions: a sensor function for detecting at least one measurement variable of a body of a user, in particular a diagnostic function; an actuator function for exerting at least one effect on a body of a user, in particular a medication function.

Item 12: The method according to any of the preceding items, wherein at least one of the network nodes is set up for carrying out at least one of the following node functions: a sensor function; an actuator function; a communication function for exchanging items of information with at least one element not assigned to the network; a communication function for exchanging items of information with at least one user; a data processing function; a data storage function; an energy obtaining function for generating energy from an environment of the network node; a clock function for providing a real time.

Item 13: The method according to any of the preceding items, wherein at least two of the network nodes are set up for communicating with one another via a body of a user as signal transmission medium.

Item 14: The method according to any of the preceding items, wherein, in the initialization step, at least one network node which is to be newly inserted into the network is physically assigned to the network, wherein the network node which is to be newly inserted exchanges the initialization information with at least one network node already present in the network.

Item 15: The method according to any of the preceding items, wherein the initialization information comprises at least one of the following items of information: an item of information about a type of one of the network nodes; an item of information about a function of one of the network nodes, in particular about a medical function; an item of information about a configuration of hardware resources of one of the network nodes, in particular about a data storage device and/or a data processing device of a network node; an item of information about a communication protocol of one of the network nodes; an information about a pre-configuration, in particular an information on a calibration and/or a mathematical set-up.

Item 16: The method according to any of the preceding items, wherein the self-organization step is carried out in such a way that the role distribution comprises an interaction of at least two network nodes for carrying out at least one function which cannot be achieved individually by the network nodes.

Item 17: The method according to any of the preceding items, wherein the self-organization step is carried out in such a way that the role distribution comprises a dynamically adaptable set of role distributions.

Item 18: The method according to any of the preceding items, wherein the self-organization step is carried out in such a way that the role distribution comprises a utilization of at least one resource of a first network node by at least one second network node.

Item 19: The method according to any of the preceding items, wherein, in the self-organization step, at least one item of information about the role distribution is stored in at least one data storage device of at least one of the network nodes, preferably in data storage devices of a plurality of network nodes.

Item 20: The method according to any of the preceding items, wherein the self-organization step is controlled by one of the following: a pre-definition of boundary conditions; a confirmation of at least one result of the self-organization step by at least one superordinate authority.

Item 21: The method according to any of the preceding items, furthermore comprising at least one log-off step, wherein at least one network node is removed from the network in the log-off step, wherein, after the log-off step, the self-organization step is carried out again in order to newly define a role distribution of the remaining network.

Item 22: The method according to the preceding item, wherein a warning is issued to a user if, in the renewed self-organization step, it is identified that a sufficient functionality of the remaining network no longer exists.

Item 23: The method according to any of the preceding items, wherein at least two of the network nodes are in each case set up for performing at least one node function, wherein the self-organization step and the work step are carried out in such a way that the function of the network comprises at least one further function going beyond the sum of the node functions.

Item 24: The method according to the preceding item, wherein the at least one further function comprises at least one of the following functions: provision of an item of information, wherein the information is generated by combination of at least two measurement variables of at least two network nodes; driving of at least one first network node by at least one second network node; a control function, wherein at least one first network node with an actuator function is subjected to open-loop and/or closed-loop control by the comparison of at least one measurement value of at least one second network node with a measurement function with at least one desired value.

Item 25: The method according to any of the preceding items, further comprising at least one monitoring step, wherein the monitoring step is set up for monitoring at least one result of the self-organization step and/or of the work step and for carrying out at least one fault routine upon identification of a standard deviation.

Item 26: The medical network for carrying out at least one medical function, wherein the medical network comprises at least two network nodes, wherein at least two of the network nodes are set up for carrying out a method according to any of the preceding items.

BRIEF DESCRIPTION OF THE DRAWINGS

Further details and features of embodiment of the invention will become apparent from the following description of exemplary embodiments, in particular in conjunction with the dependent claims. In this case, the respective features can be realized by themselves or as a plurality in combination with one another. The invention is not restricted to the exemplary embodiments. The exemplary embodiments are illustrated schematically in the figures. In this case, identical reference numerals in the individual figures designate elements which are identical or functionally identical or correspond with regard to their functions.

DETAILED DESCRIPTION

Figure 1:
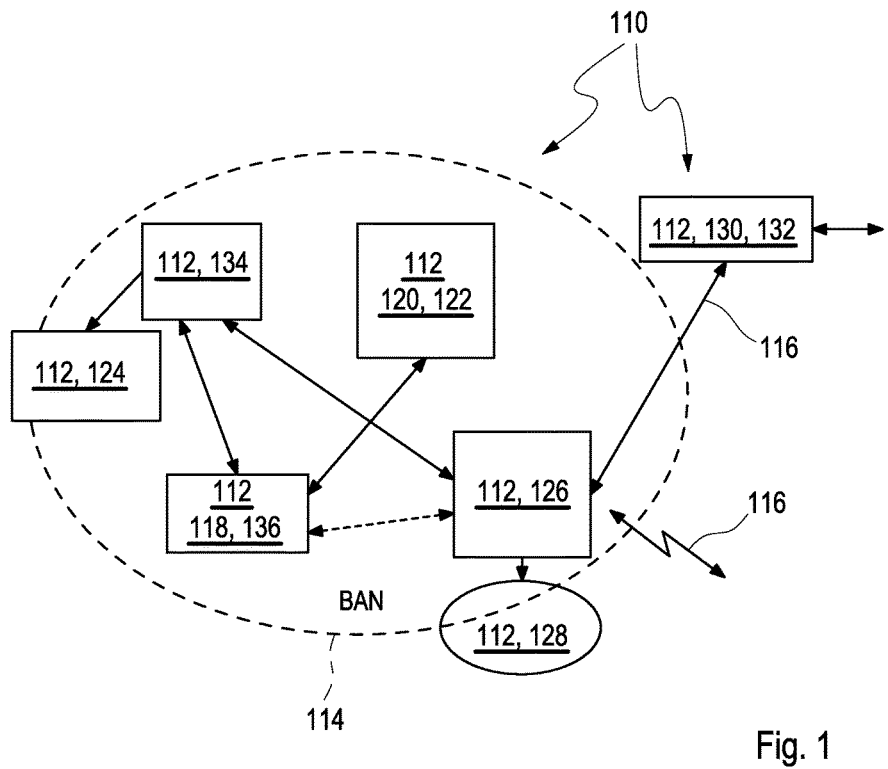
FIG. 1 shows an exemplary embodiment of a network according to embodiment of the invention.

An exemplary embodiment of a network for carrying out at least one medical function is illustrated in highly schematic fashion in FIG. 1. The network 110 comprises a plurality of network nodes 112, which are connected in a communication link with one another directly or indirectly and uni-directionally (single-headed arrow) or else bi-directionally (double-headed arrow), in such a way that each of the network nodes 112 can communicate with at least one further network node 112. This communication is effected in part by means of a body area network 114, which is designated by BAN in FIG. 1, in other words a network in which the network nodes 112 communicate with one another whilst at least partly incorporating a body of the user, for example by means of electrical signals being exchanged via the body of the user. For this purpose, the network nodes 112 can have corresponding electrodes, for example, which can directly or indirectly couple such electrical signals into the body or couple them out of the body. Furthermore, the network 110 can comprise, however, as an alternative or in addition to the network nodes 112 of the body area network 114, network nodes 112 which are not associated with the body area network 114 and which can communicate with other network nodes 112 by means of a different communication technology, for example by means of free field radio 116, radio-frequency signals (e.g. RFID, Radio Frequency Identification), Near Field Communication (NFC), real-time communication (UTC), GPS or radio controlled clock.

The network nodes 112 in the network 110 in accordance with FIG. 1 can be configured wholly or in part as modules, that is to say as elements which, in principle, can be handled independently of one another, which are not necessarily physically connected to one another by a housing and which, in principle, can perform at least one network function independently of one another. Thus, by way of example, at least one of the network nodes 112 can perform at least one function of an actuator 118, at least one of the network nodes 112 can perform at least one function of a sensor 120, at least one of the network nodes 112 can perform a function of a data storage device 122, which can be performed at least temporarily, at least one of the network nodes 112 can perform a function of a stimulator 124, for example for issuing an alarm, for example in the form of a vibrator. Furthermore, at least one of the network nodes 112 can assume for example a function of an external communicator 126, for example in order to be connected to at least one element outside the network 110 by means of free field radio or others of the technologies described above or via a different type of interface. Furthermore, one of the network nodes 112 can be configured as a wristwatch 128, for example, which can comprise one or a plurality of operating elements, for example, and one of the network nodes 112 can be configured for example with a display 130 and/or an interface 132.

Figure 5:
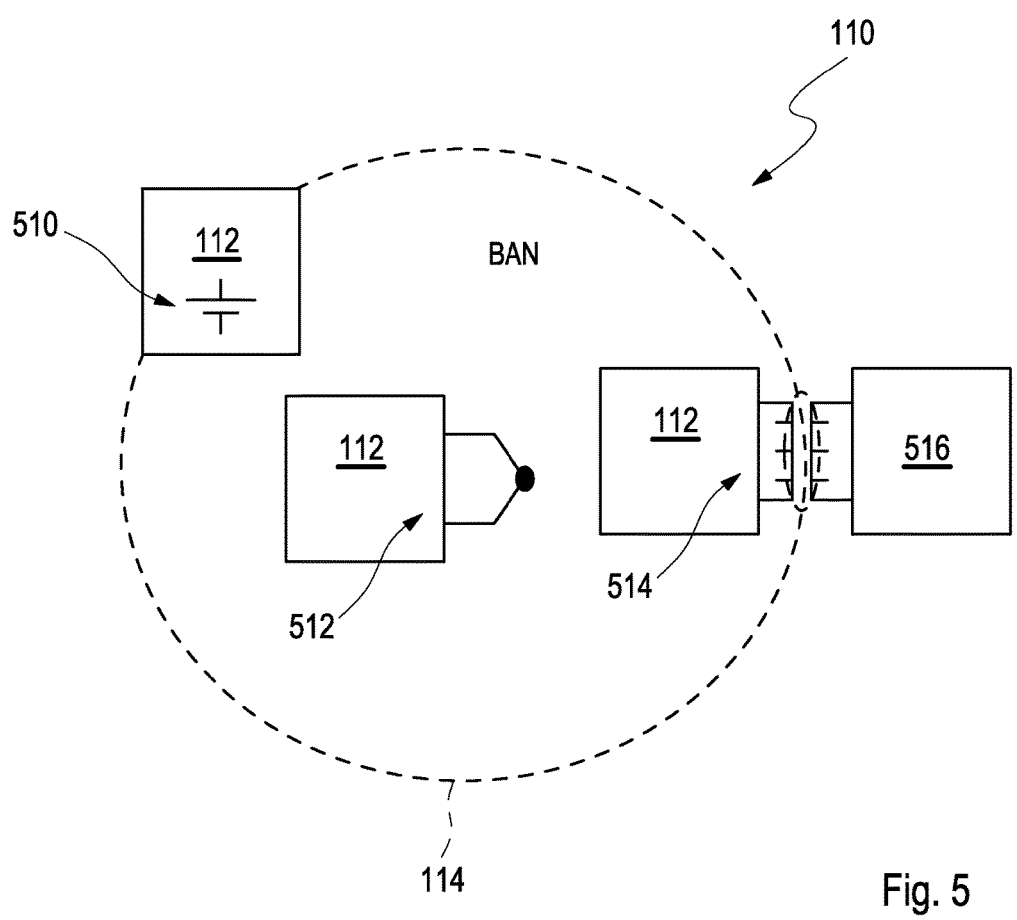
FIG. 5 shows exemplary embodiments for the energy supply of the network in accordance with FIG. 1.

The individual network nodes 112 can for example each comprise constituent parts which can support the performance of the respective node function. Thus, the individual modules of the network node 112 can for example each comprise a part which is specifically adapted for the function of the network node 112. By way of example, one or a plurality of the network nodes 112 can comprise a specific sensor part and/or actuator part. Furthermore, a controller can be provided for this functionality, for example an electronic controller and/or an arithmetic logic unit or a data processing device, for example in the form of a microcontroller. These can have clocking, for example. In principle, depending on the complexity of the task, it is also possible to use for example parallel arithmetic logic units in one or a plurality of the network nodes 112, or digital signal processors (DSP). Furthermore, one, a plurality or all of the modules of the network nodes 112 can comprise program and/or data storage devices, and also unidirectional and/or bidirectional communication devices and/or interfaces for communication with other network nodes 112. Furthermore, in all, a plurality of or individual network nodes 112, provision can be made of devices for obtaining energy and/or for providing energy, and/or devices for energy management, for example in the form of primary batteries, secondary batteries, inductive energy coupling-in, energy harvesting or the like, which will be explained in greater detail below with reference to FIG. 5. As an alternative or in addition, the network nodes 112 can also be set up completely or in part for the adaptation of the supply depending on the field of use.

The optional stimulator 124 can be set up for example for outputting physiological stimuli, for example in the form of a warning. At least one of the network nodes 112 can optionally also comprise, apart from at least one sensor 120, simultaneously also at least one actuator 118, for example an actuator for administering a substance. It is thus possible to realize integrated modules, for example so-called "Closed Loops". The term integrated module generally denotes a module in which an actuator 118 and a sensor 120 can be spatially situated relatively close together. However, a glucose sensor generally has to be at a minimum distance from an insulin feed, for example, since otherwise the glucose to be measured is directly influenced by the insulin that is fed (short circuit).

Figure 2:
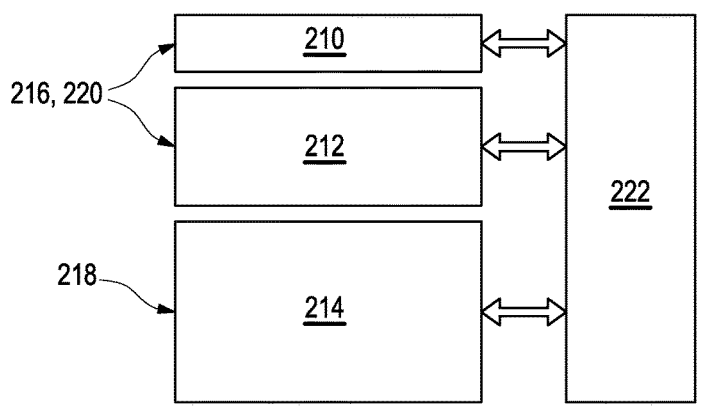
FIG. 2 shows a typical program structure of one, a plurality or all of the network nodes of the network.

During the performance of the method, a program is executed on all or at least some of the network nodes 112, which program can be realized as a software program for example. In this case, the individual programs of the individual network nodes 112 considered separately can be regarded as programs, or the overall functionality of the network 110 can be described by an overall program which is decomposed into numerous individual program modules of the network nodes 112. One example of a program of this type is illustrated in FIG. 2. This program can be composed for example of a boot sector 210 in each case. Said boot sector 210 comprises, for example, a loading program for each or at least some of the network nodes 112. This part of the program can establish for example the basic operational readiness of the network nodes 112, for example of a microcontroller of the network nodes 112, after the start.

Furthermore, the program in accordance with FIG. 2 comprises a set of fixed rules 212. These fixed rules 212 may or even should comprise for example rules for an initialization step of the proposed program such as was explained above and will also be presented below by way of example with reference to FIG. 3. These fixed rules 212 can comprise unchangeable fundamental rules, for example. This set of fixed rules 212 can contain, by way of example, driver programs for hardware, hierarchy declarations, interrupt handling, interoperability rules or the like. Besides the initialization step, these fixed rules 212 can also comprise rules for the work step, that is to say rules which comprise the actual node function of each or of a plurality of the network nodes 112.

Furthermore, the program in accordance with FIG. 2 comprises an adaptive program part 214. By way of example, variable, self-learning assembly structures can be combined in this adaptive program part 214. By way of example, this adaptive program part 214 can relate to the definition of parameters, to logical conditions, to algorithms, to module management with regard to a role distribution, to communication rules, to protocols or the like. Accordingly, this adaptive program part 214 should essentially be ascribed to the self-organization step described above.

In accordance with these assignments, in FIG. 2 by way of example the initialization step is designated by the reference numeral 216, the self-organization step is designated by the reference numeral 218 and the work step is designated by the reference numeral 220.

The program parts of the program in accordance with FIG. 2 can in turn be uni-directionally or bi-directionally linked to one or a plurality of optional databases 222 and/or data storage devices. These can be configured completely or in part in centralized or else decentralized fashion, redundant data storage preferably also being used.

In the case of the program in accordance with FIG. 2 and in the network 110 in accordance with FIG. 1, software and/or hardware structures can adapt to new tasks. Thus, by way of example, one or a plurality of the network nodes 112 can undertake the role of a master 134 temporarily or for a longer time, whereas one or a plurality of the network nodes 112 can undertake the role of a slave 136 temporarily or permanently. This can be effected by adaptation of the software structures. As an alternative or in addition, hardware structures can also generally be adapted. Thus, by way of example, logic arrays can temporarily interconnect logic functions. By way of example, so-called Field-Programmable Gate Arrays (FPGAs) can be used for this purpose. Analogue functions can also be temporarily adapted to the tasks, such as, for example, filter time constants, gain factors or the like.

In order to be able to carry out comprehensive data logging (for example for the handling of subsequent compliance cases) in conjunction with readily manageable storage outlay, the data are preferably highly compressed, for example by means of a redundancy filter. In this case, by way of example, data sampling rates and dynamic resolution for data reduction can be adapted to the specific limiting frequency or signal magnitude of the function. In the case of a blood glucose measurement, for example a continuous blood glucose measurement, sampling can be effected for example with a frequency of 1 Hz at a resolution of 10-12 bits.

The programs and data of the network 110 can be protected by corresponding encryption, for example, against unauthorized access and unauthorized use or undesired or unauthorized alteration from outside.

The network nodes 112 or the modules can, by way of example, be implanted at the body, on the skin, under the skin or in deeper layers in the body, or be kept there temporarily. By way of example, one or a plurality of the network nodes 112 can be configured as stomach and/or intestinal camera, glucose sensor, temperature sensor or sensor in the bloodstream. In this case, by way of example, network nodes 112 or modules can be supplied with energy from the environment. This is indicated by way of example in FIG. 5, in which the network 110 in accordance with FIG. 1 is illustrated again symbolically and without any claim of completeness. Thus, by way of example, at least one of the network nodes 112 or a module can comprise an energy store 510. This can be a primary or secondary battery, for example. As an alternative or in addition, at least one of the network nodes 112 can be configured with a device 512 for energy harvesting By way of example, said device 512 can draw energy from the environment in the form of electrochemical energy, in the form of temperature differences, in the form of mechanical energy (for example vibrations) or the like. Such modules for the purpose of energy harvesting are known in principle.

Once again as an alternative or in addition, one or a plurality of the network nodes 112 can be equipped with a device 514 for inductive energy supply and/or for capacitive energy supply. By way of example, network nodes 112 arranged just under the surface of a user's skin can be supplied with energy inductively. Such modules or network nodes 112 can comprise, for example, a housing appropriate for the task, for example a stainless steel capsule for implants, a plastic housing with plaster for external securing on the skin or the like. The module components are preferably designed to be biocompatible and for staying in the body for a relatively long period, in particular with regard to a thermal loading capacity, an insensitivity to moisture, or the like. The device 514 can interact with an external energy supply device 516, which can couple energy into the device 514 and the associated network node 112 inductively, for example.

Figure 3:
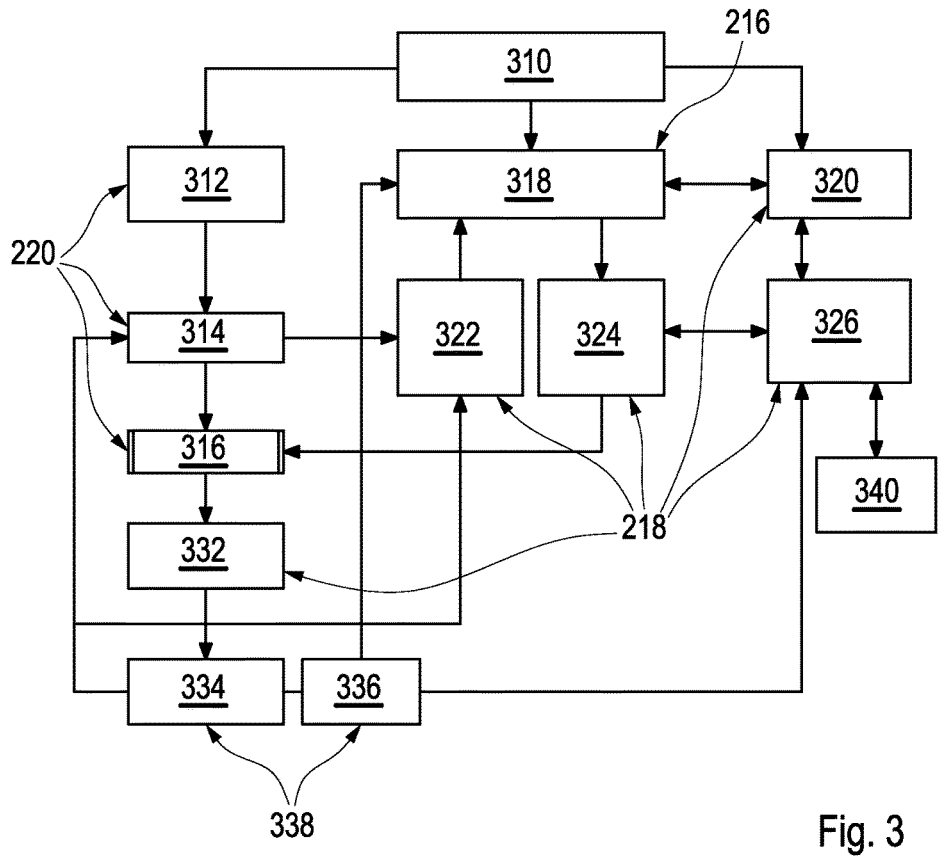
FIG. 3 shows an example of a method for setting up a medical network according to the embodiments of the invention.
Figure 4:
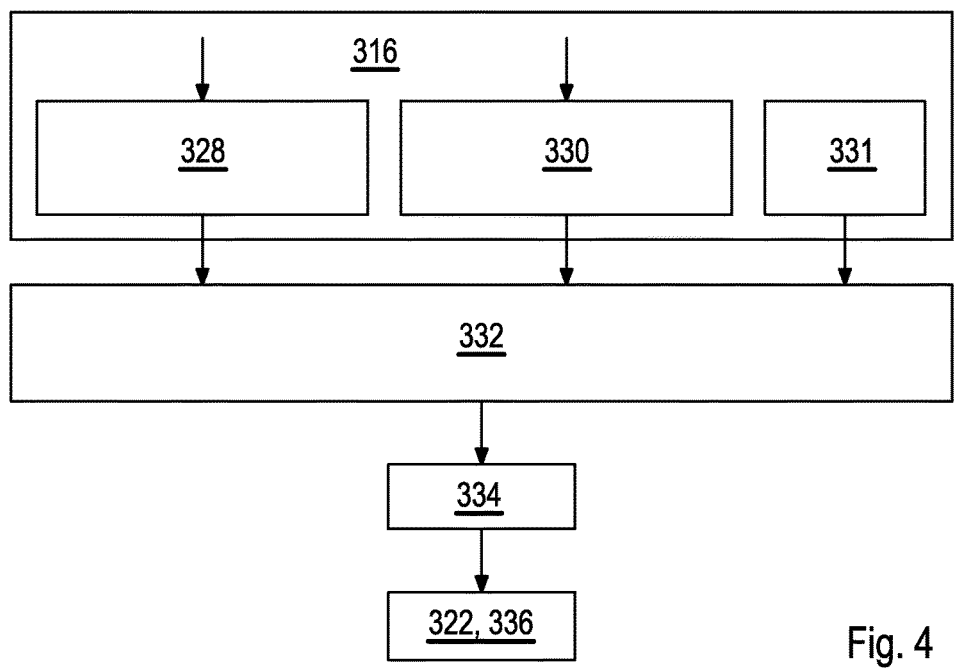
FIG. 4 shows a detail illustration of an assessment step and rule creation step of the method in accordance with FIG. 3.

FIGS. 3 and 4 illustrate by way of example an exemplary embodiment of a method for setting up a medical network 110 for carrying out at least one medical function. As explained above, setting up can in this case comprise primary new creation of a network 110 of this type, modification of a network and, if appropriate, standard operation of a network 110 of this type.

The method necessitates, in principle, the physical assignment of at least two, preferably three or more of the network nodes 112 to the network 110. This can be effected for example by the network nodes 112 being attached to a body, implanted in the body or assigned to the network 110 in some other way. If appropriate, this can also be effected by means of corresponding aids, such as, for example, insertion aids, needles or the like. Directly after the start of establishment of operation, which is designated by the reference numeral 310 in FIG. 3, and also, if appropriate, after a boot program has been carried out, the modules or network nodes 112 can commence their primary node function, which is designated by the reference numeral 312 in FIG. 3. This can already be part of the work step 220. As an alternative, said work step 220 can also be commenced at a later point in time. The primary node function can consist, for example, in the original task of the network nodes 112, for example in measurement of glucose after making contact with a battery, an actuator function or the like. Furthermore, the network nodes 112 can, for example, collect data (reference numeral 314 in FIG. 3) and assess said data (reference numeral 316 in FIG. 3). Steps 314 and 316 can likewise be part of the work step 220.

Furthermore, in the case of the method in accordance with FIG. 3, at least one initialization step is carried out. In this initialization step 216, at least two of the network nodes 112 communicate with one another and exchange in a unidirectional or bidirectional fashion at least one item of initialization information comprising at least one item of information characterizing the network nodes, i.e. all, some or at least one of the network nodes. This method step of communication with at least one other module is designated by the reference numeral 318 in FIG. 3.

By way of example, the network nodes 112 can communicate and seek partner modules in and/or on the body or in proximity to the body. If other network nodes 112 of this type are found, then a self-organization step 218 can be carried out, for example, which can comprise a plurality of sub-steps in the program in accordance with FIG. 3. The aim of this self-organization step is to define a role distribution of the network nodes 112 of the network 110. This role distribution can concern for example the interaction of the network nodes 112, for example a distribution of the functions as master 134 and slave 136, for example by identification of which network node 112 has the optimum resources for the respective role, for example an optimum microcontroller, in particular a microcontroller having high computing power and/or a high clock frequency for the function of the master 134. As an alternative or in addition, the role distribution can also comprise the functionality of the entire network 110 and define for example at least one function of the network 110 which is possible only as a result of the interaction of a plurality of network nodes 112 and which goes beyond the sum of the individual functions of the network nodes 112.

Thus, the self-organization step 218 can comprise for example a coordination process which comprises a pairing and defines master-slave roles, for example. The linking to the body area network 114 makes it possible to ensure, for example, that only the modules or network nodes 112 attached in and/or on or in proximity to the body begin a communication and an unambiguous pairing is thereby effected. In order to prevent, if appropriate, modules from another person from being able to be linked into a body area network, it is possible, by way of example, for signal levels to be discriminated or intensity patterns to be evaluated. Thus, a body area network in the body will generally have a certain constancy.

Furthermore, in the initialization step 216 or else in the self-organization step 218, a search for an external communicator 126 can also be carried out actively by one or a plurality of network nodes 112. This can involve, for example, a specific network node 112 or a specific module which establishes a connection between the body area network 114 and an outside world, for example a bearer or a care giver. If such an external communicator 126 is found, then the network 110 attempts to connect itself to the outside world preferably via said external communicator and, for example, via the display 130. As an alternative or in addition, a display 130, as shown in FIG. 1, can also itself be part of the network 110, for example in the context of a wristwatch 128 having a corresponding display. If an external communicator 126 is not found, then the network 110 can preferably nevertheless commence its work, for example the initialization step 216, the self-organization step 218 and/or the work step 220, for example by means of synchronization being carried out and/or by means of primary functions of the individual network nodes 112 or synergistic functions of a plurality of network nodes 112 being carried out.

The external communicator 126 can also be linked into the network 110 by means of interactive handling by a user, for example by bringing it in proximity to the body. By way of example, specific mechanical precautions, a skin contact, an RFID contact or the like can be carried out for this purpose.

Parameterization data, calibration data or similar data can be requested module-specifically if an external communicator 126 is available. The modules or network nodes 112 can then work and stay in a basic function, for example collect and/or log un-calibrated data, until such parameterization data and/or calibration data are available. If calibration data are not made available within an appropriate period of time, then it is possible, by way of example, to effect a suitable new organization with a message, provided that the latter can be transmitted, or, if appropriate, a termination of function.

Furthermore, master and/or slave roles are preferably defined in the self-organization step 218. This method step is designated symbolically by the reference numeral 320 in FIG. 3. If new network nodes 112 are added to the network 110, then these relationships can be distributed anew, for example by means of the initialization step 216 and/or the self-organization step 218 or parts of these steps being carried out anew. By way of example, the master role can be allocated to that network node 112 or module which has the most time-critical application, for example an EEG module. Efficient interrupt handling can be organized in this way. As an alternative or in addition, the network node 112 or the module which has the most time between the individual actions can also be allocated the role of the master 134, since it then also has time for further management tasks.

In general, one, a plurality or all of the network nodes 112 can have at least one item of property information which characterizes the respective network node and can thus be part of the characterizing information. In the initialization step 216, this characterizing information can be exchanged one-way or reciprocally and be compared with one another in order to carry out optimum self-organization in the self-organization step 218. Thus, the property descriptions can be compared and the properties of the network nodes 112 can be mutually presented in order that other network nodes 112 can assess them and, if appropriate, can include them in their task set. By way of example, an insulin pump can acquire items of information from a glucose sensor and thereby control the release of insulin. Furthermore, by way of example, a temperature module and/or a food ingestion module can be added. The insulin module can, after an interactive confirmation, if appropriate, then incorporate the items of information with respect to the algorithm and modify the insulin control.

These method steps of self-organization are designated symbolically by the reference numerals 322, 324 and 326 in FIG. 3. Thus, by way of example, the reference numeral 322 designates outputting of items of information to other network nodes 112 or external experts. The reference numeral 324 designates by way of example the interrogation of items of information from other network nodes or from experts. The reference numeral 326 generally designates the module or system management for the management of one, a plurality or all of the network nodes 112. The steps 322 to 326 are symbolically assigned to the self-organization step 218 in FIG. 3. As an alternative or in addition, however, these sub-steps can also be assigned to other steps of the program, for example to the work step 220. Thus, the initialization step 216, the self-organization step 218 and the work step 220 can also jointly utilize one or a plurality of sub-steps of the program in accordance with FIG. 3. Further, the method according to FIG. 3 may include one or more steps of time synchronization 340. In FIG. 3, as an example, an interaction of the time synchronization 340 with the step of module or system management 326. Alternatively or additionally, other steps of the method may be time-synchronized.

Furthermore, in FIG. 3, the reference numeral 316, as explained above, designates a sub-step of the assessment of the data. This sub-step 316 can likewise be part of the work step 220 or, as an alternative or in addition, part of the self-organization step 218. The sub-step of assessment 316 is shown by way of example again in a more detailed illustration in FIG. 4. This sub-step can be carried out for example in one of the network nodes 112 or in a plurality of said network nodes 112 and can comprise for example evaluation and assessment of data 328, for example dedicated data of the respective network node 112 and/or moreover other network nodes 112. By way of example, the assessment of the data can make use of one or a plurality of filter algorithms. For assessing the data, by way of example, the format of the data can be adapted and/or assessed, time criteria can be employed, the dynamic range of the data can be influenced or evaluated, or a statistical analysis and/or pattern recognition of the data can be carried out. Combinations of the abovementioned evaluations and/or other evaluations are also conceivable.

Furthermore, items of information from other network nodes 112 are designated by the reference numeral 330 in FIG. 4. By way of example, in this case it is possible to check authenticity, plausibility, frequency or similar criteria, or it is possible to employ discriminator thresholds. Combinations of the abovementioned possibilities are also conceivable.

Further, as illustrated in FIG. 4, besides the data evaluation 328 and the information 330 from other network nodes 112, a fixed set of rules 331 may be used as a basis for the creation 332 of new rules.

The assessment 316 of the data can take place with time synchronization 340, for example. By way of example, time synchronization 340 with UTC can be effected. This can be effected in particular in the case of battery-backed network nodes 112 or network nodes 112 set up in some other way such that an energy supply is not interrupted during the entire operation of the network nodes 112. The time synchronization with UTC can be effected as early as during production for example in the case of such network nodes 112, in particular in the case of battery-backed modules. In general, however, modules which, by way of example, are not supplied with energy until they are started up (for example a glucose sensor module supplied with energy from the surrounding glucose or by means of a temperature gradient) are synchronized with the UTC only upon contact with the external communicator 126 and an external RTC.

From the knowledge of the corresponding network nodes 112 or modules, the individual network nodes can also establish rules for the normal case. This creation of rules is designated symbolically by the reference numeral 332 in FIGS. 3 and 4. This can also involve the establishment of a new rule. By way of the external communicator 126, by way of example, the rules can be compared with rules established in a superordinate fashion. In this case, by way of example, a check for a collision can be effected, which is designated symbolically by the reference numeral 334 in FIG. 3. This check can be carried out by means of a plausibility consideration, by way of example. The module rules can be modified and coordinated with those of other modules or network nodes 112, for example by means of corresponding forwarding to the module/system management 326.

The creation of the rules 332 in the rule generator can be effected in various ways. The rules can first of all relate to the functionality of the entire network 110 or to parts of the network 110, for example data evaluation. In this way, it is possible, by way of example, to create rules for the data evaluation which are based on the interaction of items of information and/or functions of a plurality of network nodes 112, such that new functions for the entire network 112 or parts thereof can arise from this interaction of the network nodes 112. Furthermore, the creation of the rules in method step 332 can also relate to the system organization of the network 110. Determined or adaptive formation laws can generally be used during the rule creation 332.

Further, a fault identification 336 can be effected for example by interrogation of whether predetermined rules, conventions, thresholds or the like are contravened. If, by way of example, patterns of behaviour deviate greatly from the present rules, then failsafe measures can be initiated depending on the definition of the discrimination thresholds, by way of example. Accordingly, the method can comprise for example at least one monitoring step, designated symbolically by the reference numeral 338 in FIG. 3. The fault identification 336 and the check for a collision 334 can be part of said monitoring step 338, by way of example. The assessment 316 and/or the rule creation 332 can also be incorporated wholly or partly into the monitoring step 338. The failsafe measures can be configured as a fault routine, for example, and can comprise for example a corresponding message, a shutdown, a temporary shutdown or the like. The failsafe rules and the discrimination thresholds either can be defined or can moreover be dynamically adapted depending on empirical values or else be adapted after interrogation and/or confirmation and/or evaluation of a defined entity.

A rule modification should preferably be checked and confirmed by a defined entity prior to implementation. This can also be part of the monitoring step 338. By way of example, during initialization of a network or incorporation of individual network nodes 112 into the network 110, an interactive phase with an expert, for example a physician, could be carried out in such a way that, by way of example, on account of detected data, the module to be initiated or the network node 112 to be initiated presents rule proposals or modification proposals, which can then be confirmed and/or modified by an expert. The network 110 can in turn derive rules from the interactive process and thus adapt the process iteratively, taking account of oscillation stability criteria.

The self-organization step 218 can furthermore imply a change in the role distribution. By way of example, tasks of individual or a plurality of network nodes 112 or modules can be permanently or temporarily transferred to other modules or network nodes. This can be effected, for example, if computational capacities and/or storage capacities no longer suffice. Thus, by way of example, module controllers can mutually support one another as required, for example in the context of a multicore system. Memory space can also be managed jointly, for example, and scarcely sufficient local memory of individual network nodes 112 can thus be extended. By way of example, such actions are communicated to the master 134 or preferably coordinated exclusively by the latter.

In order to optimize interoperability, it is possible to establish a standard set of rules and commands for the network 110 and/or individual or a plurality of network nodes 112. These can be agreed uniformly, e.g. nationally and/or internationally, among manufacturers, for example, such that modules or network nodes 112 from different manufacturers can also be used in the network 110.

Thus, embodiments of the method for generating a medical network are disclosed. One skilled in the art will appreciate that the teachings can be practiced with embodiments other than those disclosed. The disclosed embodiments are presented for purposes of illustration and not limitation, and the invention is only limited by the claims that follow.

What is claimed is:

1. A method for setting up a medical network for carrying out at least one medical function, said medical network including at least two network nodes set up for communicating with one another, comprising: at least one initialization step, wherein at least two network nodes exchange at least one item of initialization information, wherein the initialization information includes at least one item of information characterizing the network nodes; at least one self-organization step, wherein the network nodes define a role distribution of the network nodes; and at least one work step, wherein the network carries out the at least one medical function in the work step, wherein at least two of the network nodes interact in accordance with the role distribution defined in the self-organization step, wherein the self-organization step is carried out in such a way that the role distribution comprises an interaction of at least two network nodes for carrying out at least one function which cannot be achieved individually by the network nodes, wherein a warning is issued to a user if, in the self-organization step, it is identified that a sufficient functionality of the remaining network no longer exists, wherein the self-organization step is carried out such that the network node having the most time-critical function is defined as a master node and wherein the most time-critical function comprises requiring the immediate attention by a user, when the network node generates abnormal results.

2. The method as in claim 1, wherein the self-organization step is carried out in such a way that the role distribution comprises a dynamically adaptable set of role distributions.

3. The method as in claim 1, wherein the self-organization step is carried out in such a way that the role distribution comprises a utilization of at least one resource of a first network node by at least one second network node.

4. The method as in claim 1, wherein, in the self-organization step, at least one item of information about the role distribution is stored in at least one data storage device of at least one of the network nodes.

5. The method as in claim 4, wherein the data storage device comprises data storage devices in a plurality of network nodes.

6. The method as in claim 1, wherein the self-organization step is controlled by one of the following: a pre-definition of boundary conditions; or a confirmation of at least one result of the self-organization step by at least one superordinate authority.

7. The method as in claim 1, further comprising at least one log-off step to remove one network node; and, after the log-off step, the self-organization step is carried out again in order to newly define a role distribution of the remaining network.

8. The method of claim 1, wherein the network is configured such that any one of said network nodes can take on the role of the master node during operation of the network.

9. A method for setting up a medical network for carrying out at least one medical function with the medical network including at least two network nodes set up for communicating with one another, comprising: at least one initialization step, wherein at least two network nodes exchange at least one item of initialization information in the initialization step, wherein the initialization information includes at least one item of information characterizing the network nodes; at least one self-organization step, wherein the network nodes define a role distribution of the network nodes; and at least one work step, wherein the network carries out the at least one medical function in the work step, wherein at least two of the network nodes interact in accordance with the role distribution defined in the self-organization step, wherein the self-organization step is carried out in such a way that the role distribution comprises an interaction of at least two network nodes for carrying out at least one function which cannot be achieved individually by the network nodes, wherein at least two of the network nodes are in each case set up for performing at least one node function, and wherein the self-organization step and the work step are carried out in such a way that the function of the network comprises at least one further function going beyond the sum of the node functions, wherein the self-organization step is carried out such that the network node having the most time-critical function is defined as a master node and wherein the most time-critical function comprises requiring the immediate attention by a user, when the network node generates abnormal results.

10. The method of claim 9, wherein the network is configured such that any one of said network nodes can take on the role of the master node during operation of the network.

11. A method for setting up a medical network for carrying out at least one medical function with the medical network including at least two network nodes set up for communicating with one another, comprising: at least one initialization step, wherein at least two network nodes exchange at least one item of initialization information in the initialization step, wherein the initialization information includes at least one item of information characterizing the network nodes; at least one self-organization step, wherein the network nodes define a role distribution of the network nodes; and at least one work step, wherein the network carries out the at least one medical function in the work step, wherein at least two of the network nodes interact in accordance with the role distribution defined in the self-organization step, wherein at least one further function is provided and comprises at least one of the following functions: provision of an item of information, wherein the information is generated by combination of at least two measurement variables of at least two network nodes; driving of at least one first network node by at least one second network node; a control function, wherein at least one first network node with an actuator function is subjected to open-loop and/or closed-loop control by the comparison of at least one measurement value of at least one second network node with a measurement function with at least one desired value, wherein the self-organization step is carried out such that the network node having the most time-critical function is defined as a master node and wherein the most time-critical function comprises requiring the immediate attention by a user, when the network node generates abnormal results.

12. The method of claim 11, wherein the network is configured such that any one of said network nodes can take on the role of the master node during operation of the network.

* * * * *